United States Patent [19]

De Vincent et al.

[11] 3,851,672

[45] Dec. 3, 1974

[54] HOSE ASSEMBLY WITH PREPOSITIONED HOSE MOUNTING BRACKET

[75] Inventors: Patsy De Vincent, Dayton; John V. Hepke, Vandalia, both of Ohio

[73] Assignee: General Motors Corporation, Detroit, Mich.

[22] Filed: May 18, 1973

[21] Appl. No.: 361,781

[52] U.S. Cl. .............................................. 138/106
[51] Int. Cl. ............................................... F16l 3/12
[58] Field of Search ............... 248/74 R, 74 A, 75; 285/24, 27, 62, 93; 138/103, 106, 107, 109, 110, 118

[56] References Cited
UNITED STATES PATENTS
3,707,032  12/1972  Brunelle et al. .................... 138/110

*Primary Examiner*—Herbert Goldstein
*Attorney, Agent, or Firm*—Arthur N. Krein

[57] ABSTRACT

A hose assembly including a flexible hose, hose fittings secured to opposite ends of the hose and each fitting having a mounting orientation guide thereon, the hose fittings being secured to the hose with their guides in proper angular orientation with respect to each other and, a hose support bracket crimped to the hose intermediate the ends thereof and having a mounting flange thereon which is in fixed orientation with respect to the mounting orientation guides on the hose fittings.

2 Claims, 6 Drawing Figures

PATENTED DEC 3 1974　　　　　　　　　　　　　3,851,672
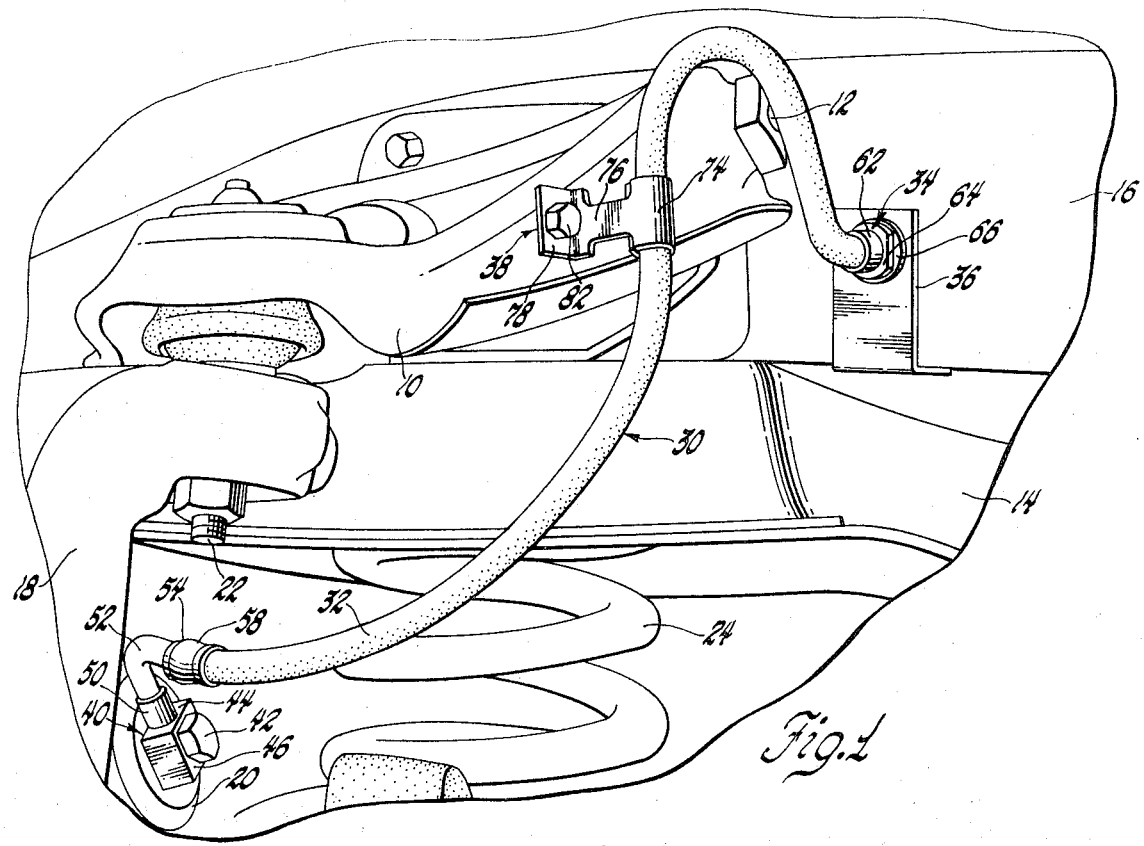
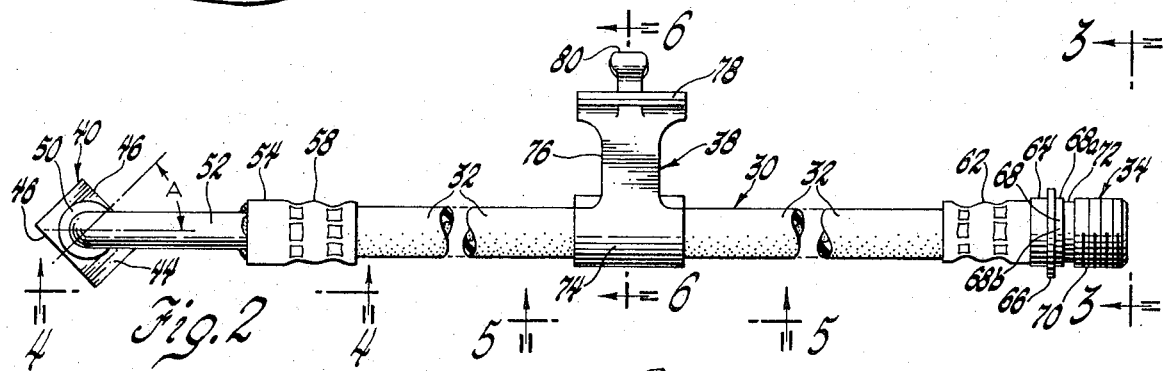
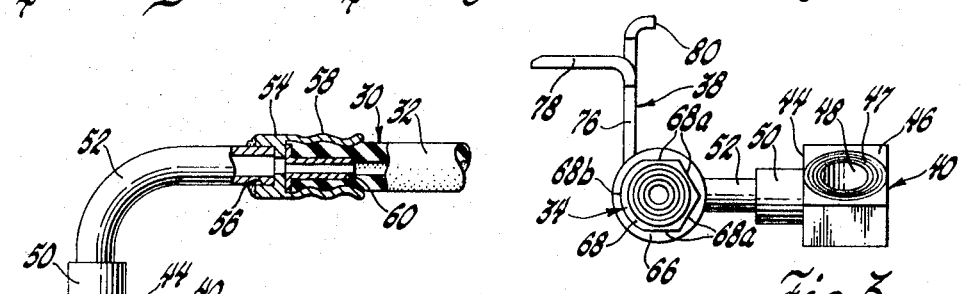
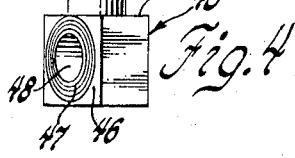
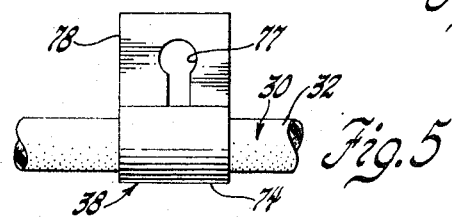
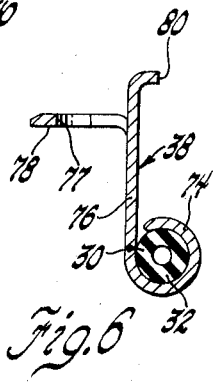

HOSE ASSEMBLY WITH PREPOSITIONED HOSE MOUNTING BRACKET

This invention relates to a hose assembly and, in particular, to a prefabricated hose assembly for use in a hydraulic system.

In various applications in which a flexible conduit, such as a hose, is used to convey fluid, it is necessary to bend and route the flexible conduit around various structural or frame parts of the device on which the flexible conduit is being used to convey fluid. In addition, where such a flexible conduit in the form of a hose is used to convey high pressure fluid, such as in a hydraulic system, the actual length of the hose will change due to the pressure of the fluid within the hose.

One such application, for example, is on automotive passenger and truck vehicles, wherein such flexible conduits, in the form of brake hoses, are used to convey hydraulic brake fluid to the individual wheel brakes of the vehicle. In some of these vehicles, each brake hose assembly requires accurate routing, for example, from the disc brake caliper of a vehicle wheel assembly to a fixed element of the vehicle to insure proper clearance between the hose and other components of the vehicle.

In the prior art, this has been affected by the use of a hose assembly including a hose having fittings at opposite ends thereof, the fittings being provided with orientation guides thereon whereby these fittings can only properly mate with the components with which they are associated in one predetermined position. Such a hose assembly when installed in certain applications on a vehicle require an additional fixed routing position on the hose body intermediate the ends thereof. This is effected in the prior art by having the hose held intermediate its ends in spaced apart relation from a support by the use of a hose support bracket having a bracket portion adapted to be fixed to the support and a hose clamp portion, clamped either directly to the hose or preferably, to a protective collar attached to the hose in position to be engaged by the hose clamp portion of the support bracket.

Prior to this invention, it has been customary to assemble such a hose support bracket to the hose at the time the hose assembly is installed in a vehicle. That is, it has been customary to install one or both end fittings of the hose assembly to their mating components with which they cooperate, after which the hose support bracket is attached to effect proper routing of the hose intermediate its ends and to hold it in spaced relation from a support. This has been accomplished either by first fixing the hose clamp portion of the support bracket to the hose and then twisting the hose as necessary to seat the support bracket to the support on which it is attached or, alternately, first seating the bracket to its support and then, as necessary, twisting the hose into engagement with the hose clamp portion of the support bracket to permit its attachment to the support bracket. Depending on the degree of twisting effected on the hose during such an installation of the hose assembly on the vehicle, the life of the brake hose will be adversely affected as compared to the expected life of a non-twisted hose in a similar assembly.

It is therefore the principal object of this invention to provide a hose assembly wherein all the elements of the hose assembly, including at least one hose support bracket, are positively secured in fixed orientation with respect to each other on the hose of the assembly prior to its installation in the system in which it is to be used.

Another object of this invention is to provide a hose assembly in which the hose, the end fittings thereof and a hose support bracket are secured to the hose in proper orientation with respect to each other while the hose itself is held in a relaxed, straight, untwisted position.

Still another object of this invention is to provide a hose assembly having a hose support bracket crimped to the hose intermediate the ends thereof and in fixed orientation with respect to end fittings secured to opposite ends of the hose, the hose support bracket being provided with a configuration to allow the bracket to be closed with the proper crimp diameters required to tightly hold the hose in position without restricting the inner tube of the hose.

These and other objects of the invention are attained by means of a hose assembly including a flexible hose, a first hose fitting secured to one end of the hose and having a mounting orientation guide thereon, a second hose fitting connected to the opposite end of the hose and having a mounting orientation guide thereon, the second hose fitting being secured to the hose with its mounting orientation guide in a predetermined orientated relationship with respect to the mounting orientation guide of the first hose fitting, and a hose support bracket crimped to the hose intermediate the ends thereof with a guide or mounting flange of the support bracket positioned in a predetermined orientation relationship with respect to the mounting orientation guides of the hose fittings.

For a better understanding of the invention, as well as other objects and further features thereof, reference is had to the following detailed description of the invention to be read in connection with the accompanying drawings, wherein:

FIG. 1 is a perspective, somewhat schematic, view of a portion of the front end of a passenger vehicle having a hose assembly in accordance with the invention used as the hydraulic brake hose assembly for supplying hydraulic fluid to a disc brake caliper of the vehicle;

FIG. 2 is a view of the hose assembly of the invention with the hose portion of this assembly shown in a relaxed, straight, untwisted position prior to its installation in a vehicle;

FIG. 3 is an end view of the hose assembly of FIG. 2 taken along the line 3—3 of FIG. 2;

FIG. 4 is a view of one of the end fittings (the banjo block fitting) of the hose assembly of FIG. 2 taken along line 4—4 of FIG. 2, with part of the hose coupling end of this fitting broken away;

FIG. 5 is a view of the hose support bracket of the hose assembly taken along line 5—5 of FIG. 2; and, FIG. 6 is a sectional view of the hose support bracket taken along line 6—6 of FIG. 2.

Referring now to FIG. 1, there is illustrated, for the purpose of showing an environment in which the hose assembly of the invention can be used, a portion of the front end of a conventional automotive vehicle provided with, for example, an independent suspension system. Such an independent suspension system includes an upper control arm 10 and a lower control arm, not shown, supported by an upper control arm shaft 12, and a lower control arm shaft, not shown, suitably attached to the suspension cross member 14 fixed to one of the side frames 16 of the vehicle. These control arms are connected to the steering knuckle assembly 18, supporting the wheel hub, not shown, and the disc brake caliper assembly 20, through pivoting ball socket assemblies 22, only a portion of one such ball socket assembly being shown. The coil spring 24 is located between the lower control arm and a formed seat in the suspension cross member 14.

Because of the movement of the above described elements relative to each other during vehicle operation, hydraulic fluid from the braking system, not shown, of the vehicle must be supplied to the disc brake caliper assembly 20 through a flexible conduit, usually in the form of a brake hose assembly, generally indicated by the reference numeral 30, the hose assembly shown being in accordance with the invention.

The brake hose assembly 30 includes a flexible brake hose 32 connected at one end to a hose fitting 34 secured to a conventional apertured support bracket 36 which may be an integral part of the side frame 16 or, as shown, a separate element fixed to the side frame 16, the hose fitting 34 also being connected, as is conventional, to the hydraulic brake system, not shown, of the vehicle. The hose fitting 34 is provided with one or more orientation guides thereon, to be described, so that it can only properly mate with the aperture in the support bracket in one direction, as is known in the art.

To permit proper flexing and other movement of the brake hose during vehicle operation, the length of the brake hose is greater than the straight line distance between the hose fitting 34 and the disc brake caliper assembly 20 and also of an adequate length to distribute movement during flexing and to avoid abrasion. As shown, the brake hose 32 is held away from structural elements of the vehicle, such as the upper control arm 10, by a hose bracket 38 to be described in detail hereinafter.

At its opposite end, the brake hose 32 is connected to a banjo hose fitting 40 secured to the disc brake caliper assembly 20 by a conventional threaded hose to caliper bolt 42, the bolt, as is well known, being provided with a suitable passage therein for the flow of hydraulic brake fluid.

The banjo fitting 40 includes a block portion 44 having opposite parallel mounting or orientation surfaces 46 with annular serrations 47 thereon to mate against seal washers, not shown, interposed between these surfaces and the head of bolt 42 and the disc brake caliper assembly 20 and a bore or opening 48 therethrough to receive the hose to caliper bolt 42 and a centrally apertured shank portion 50, the aperture in the shank portion being in fluid communication with the bore 48 and bent tube adapter 52 having one end thereof secured, as by welding, to the free end of the shank portion 50, the other end of the bent tube adapter being connected, again as by welding, to one end of a hose coupling 54.

The hose coupling 54 is provided with a tubular body having an enlarged bore 56 at one end thereof into which one end of the bent tube adapter is inserted before being welded thereto, the other end providing an annular collar or sleeve 58 adapted to encircle one end of the hose 32 and to be crimped into engagement therewith, an apertured hose nipple or eyelet 60 being positioned concentrically within the collar and abutting against the apertured shoulder of the coupling body, this eyelet being of a size to be inserted into the internal passage or inner tube of the hose 32.

As best seen in FIGS. 2 and 4, the bent tube adapter 52 is bent, as desired, intermediate its ends to provide for the desired departure bend angle from the disc brake caliper assembly, the axis of the portion of this adapter 52 fixed to the hose coupling 54 being positioned at the desired departure angle from the mounting surfaces of the banjo block, or from the axis of the opening 48 therethrough, the bent tube adapter 52 departing at an angle A from the axis of the bore or opening 48 in the banjo block 44, as shown in FIG. 2.

Referring now to FIGS. 2 and 3, the hose fitting 34, which may be either female threaded or, as shown, male threaded, includes a body portion having at one end thereof a hose coupling end including a collar 62 and an eyelet, not shown, similar to that of the banjo fitting 40 by which the hose is secured to this fitting, a central or intermediate wrench receiving section 64 applicable for accommodating a wrench, a radially extending annular flange to provide a collar 66 or backing for abutment against the support bracket 36 and on the other side of the collar 66 toward the threaded end of this fitting with an outer peripheral orientation guide portion which, as seen in FIG. 3, has four flats 68a forming part of a hexagonal section with a curved portion 68b intermediate opposed flats of this section to conform to an aperture of corresponding configuration in the support bracket 36 so that this portion of the hose fitting 34 can only properly mate with the aperture in this support bracket in one direction. The opposite end of the body portion of this fitting comprises a threaded nipple 70 which is adapted to receive and provide a fluid tight connection with a pipe or tube section, not shown, attached thereto forming part of the braking system for the vehicle. The nipple is provided with an external annular groove 72 adjacent to the orientation section 68 for receiving a suitable conventional fastener, not shown, to retain this fitting to the support bracket 36.

The hose bracket 38, made of a suitable deformable material such as sheet metal, is in the embodiment shown provided with a tubular hose clamping portion 74, which, when crimped to the hose 32, partly encircles the hose with the internal diameter of this clamp portion being such as to tightly grip the brake hose without deforming the brake hose and thus restricting the inner tube portion or aperture through this hose. This clamp portion 74 is integral with a stand-off leg 76 having an apertured 77 mounting flange 78 at right angles thereto, the stand-off leg terminating in a locating lug 80, pierced from the material of flange 78, adapted for use in properly positioning this support bracket on a support element, such as an upper control arm 10 having an aperture to receive the locating lug, the hose bracket being attached as by means of a threaded bolt 82 or other suitable fastener to the upper control arm.

In fabricating this hose assembly, a piece of hose of the desired length would be, as shown in FIG. 2, in a straight, relaxed, untwisted position with the fitting 34 secured at one end. The banjo-hose fitting 40 is secured to the opposite end of the hose with the banjo block portion 44 and bent tube adapter 52 of this fitting in proper fixed radial orientation with respect to the orientation guide portion 68 of the fitting 34, for example, the opposed flats 68a of this fitting. In the embodiment shown and as best seen in FIG. 3, the axis of the end portion of the bent tube adapter 52 secured to the shank portion 50 of the banjo block is positioned in a plane parallel to the opposed flats 68a of the orientation guide portion 68 of fitting 34. As seen in FIG. 2, the mounting surfaces 46 of the banjo block are also secured at a fixed angle as desired, with respect to the longitudinal axis of the hose when in its straight, relaxed, untwisted position, as previously described.

The clamp portion 74 of the hose bracket 38 is then crimped to the hose a predetermined fixed distance, as desired, from the flange collar 66 of fitting 34 for example, with the mounting flange 78 on this support angularly disposed, as desired, with respect to the opposed orientation guide flats 68a of the fitting 34, the supporting flange being shown in FIG. 3 as being parallel to the flats 68a on fitting 34.

With these fittings and the support bracket secured in a predetermined relationship with respect to each other on the hose 32 when the hose is in a straight, relaxed, untwisted position, positive orientation of the flexible hose 32 when mounted in an installation, such as shown in FIG. 1, will be assured. The hose assembly when thus installed will permit proper flexing and other movement of the brake hose 32 during vehicle operation, while eliminating the possibility of inadvertent twisting of the hose during installation as frequently occurred in the prior art. Positive orientation of hose helps to eliminate unnecessary forces acting on the hose per se which would reduce life of the hose.

Although a conventional banjo-hose fitting 40 was used in the brake hose assembly disclosed and illustrated, it is to be realized that other forms of hose fittings could be used in lieu of the fitting shown. For example, and preferably, a banjo fitting and hose routing bracket of the type disclosed in copending United States patent aplication Ser. No. 361,782 filed concurrently herewith on May 18, 1973, in the name of Patsy DeVincent and Bruce E. Kirkham could be secured to one end of the hose 32 in place of the banjo-hose fitting 40.

What is claimed is:

1. A hose assembly including a flexible hose of a predetermined length, a first hose fitting secured to one end of said hose and having mounting orientation means thereon, a second hose fitting having orientation guide means thereon, said second hose fitting being secured to the opposite end of said hose with said orientation guide means thereon at a predetermined angular relation with respect to said mounting orientation means of said first hose fitting when said hose is in a straight, relaxed, untwisted condition and, a hose support bracket having a hose clamp portion and an apertured mounting flange, said hose clamp portion of said hose support bracket being secured to said hose intermediate the ends thereof at a predetermined distance from said mounting orientation means of said first hose fitting with said apertured mounting flange located at a predetermined angular relationship relative to said orientation guide means of said first hose fitting when said hose is in said straight, relaxed, untwisted condition.

2. A hose assembly according to claim 1 wherein said first hose fitting is a banjo hose fitting having a block portion with opposite parallel mounting surfaces thereon forming said mounting orientation means.

* * * * *